United States Patent
Miyoshi (10) Patent No.: US 7,349,713 B2
(45) Date of Patent: Mar. 25, 2008

(54) DATA COMMUNICATION APPARATUS AND DATA COMMUNICATION METHOD

(75) Inventor: Kenichi Miyoshi, Yokohama (JP)

(73) Assignee: Matsushita Electric Industrial Co, Ltd, Osaka (JP)

( * ) Notice: Subject to any disclaimer, the term of this patent is extended or adjusted under 35 U.S.C. 154(b) by 1009 days.

(21) Appl. No.: 10/362,456

(22) PCT Filed: Jun. 25, 2002

(86) PCT No.: PCT/JP02/06342

§ 371 (c)(1),
(2), (4) Date: Feb. 25, 2003

(87) PCT Pub. No.: WO03/003647

PCT Pub. Date: Jan. 9, 2003

(65) Prior Publication Data
US 2005/0114744 A1 May 26, 2005

(30) Foreign Application Priority Data
Jun. 29, 2001 (JP) .............................. 2001-198401

(51) Int. Cl.
*H04Q 7/20* (2006.01)

(52) U.S. Cl. ...................... 455/522; 455/69; 455/67.7; 455/68; 370/333; 370/496

(58) Field of Classification Search ................ 455/522, 455/69, 456.2, 513, 67.7, 68, 70, 115.2, 126, 455/115.3, 134, 135, 161.3, 197.1, 283, 226.2, 455/226.3, 227.2; 370/333, 496, 524, 7.43, 370/298

See application file for complete search history.

(56) References Cited

U.S. PATENT DOCUMENTS 6,101,168 A * 8/2000 Chen et al. .................. 370/228

(Continued)

FOREIGN PATENT DOCUMENTS

EP 0713305 5/1996

(Continued)

OTHER PUBLICATIONS

"3GPP TR 25.858 V1.0.0(Dec. 2001)", 3rd Generation Partnership Project, Technical Specification Group Radio Access Network, High Speed Downlink Packet Access, Physical Layer Aspects (Release 5), Technical Report, pp. 1-23, Dec. 2001.

(Continued)

*Primary Examiner*—Philip J. Sobutka
*Assistant Examiner*—Dominic E. Rego
(74) *Attorney, Agent, or Firm*—Stevens, Davis, Miller & Mosher, LLP (57) ABSTRACT

A type-2 hybrid ARQ data communication device having an improved quality of transmitted data while an increase of power consumption is avoided. The communication device transmits the same information bits (S) plural times (N times) and controls (changes) the transmission power of each transmission packet so that the sum of the transmission power needed for N transmissions of the same information bits may be constant, for example, the transmission power (b) of one packet of the information bits at each transmission may be one N-th (1/N) of the transmission power (a) of one normal packet (b=a/N).

9 Claims, 8 Drawing Sheets

U.S. PATENT DOCUMENTS

| | | | |
|---|---|---|---|
| 2001/0002905 A1* | 6/2001 | Funamori | 370/342 |
| 2001/0014091 A1* | 8/2001 | Yamada et al. | 370/349 |
| 2003/0126551 A1* | 7/2003 | Mantha et al. | 714/790 |
| 2004/0013105 A1* | 1/2004 | Ahmavaara et al. | 370/349 |
| 2006/0280160 A1* | 12/2006 | Padovani et al. | 370/347 |

FOREIGN PATENT DOCUMENTS

| | | |
|---|---|---|
| JP | 06244814 | 9/1994 |
| JP | 08195709 | 7/1996 |
| JP | 2001119426 | 4/2001 |
| WO | 9604718 | 2/1996 |
| WO | 9626582 | 8/1996 |
| WO | 9819405 | 5/1998 |
| WO | 9926371 | 5/1999 |
| WO | 9967897 | 12/1999 |

OTHER PUBLICATIONS

"3G TR25.848 V1.0.0(May 2000)", 3$^{rd}$ Generation Partnership Project; Technical Specification Group Radio Access Network, Physical Layer Aspects of UTRA High Speed Downlink Packet Access (Release 2000), pp. 1-99, Mar. 2001.

* cited by examiner

PRIOR ART

DATA COMMUNICATION APPARATUS AND DATA COMMUNICATION METHOD

TECHNICAL FIELD

The present invention relates to a data communication apparatus and data communication method.

BACKGROUND ART

As an example of error control technology used in mobile communication system, there is a type-2 hybrid ARQ (Automatic Repeat reQuest) method, (hereinafter, it is referred to as "type-2 hybrid ARQ method"). Such a type-2 hybrid ARQ method uses the turbo code and is referred to as an IR (Incremental Redundancy) method.

Figure 1:
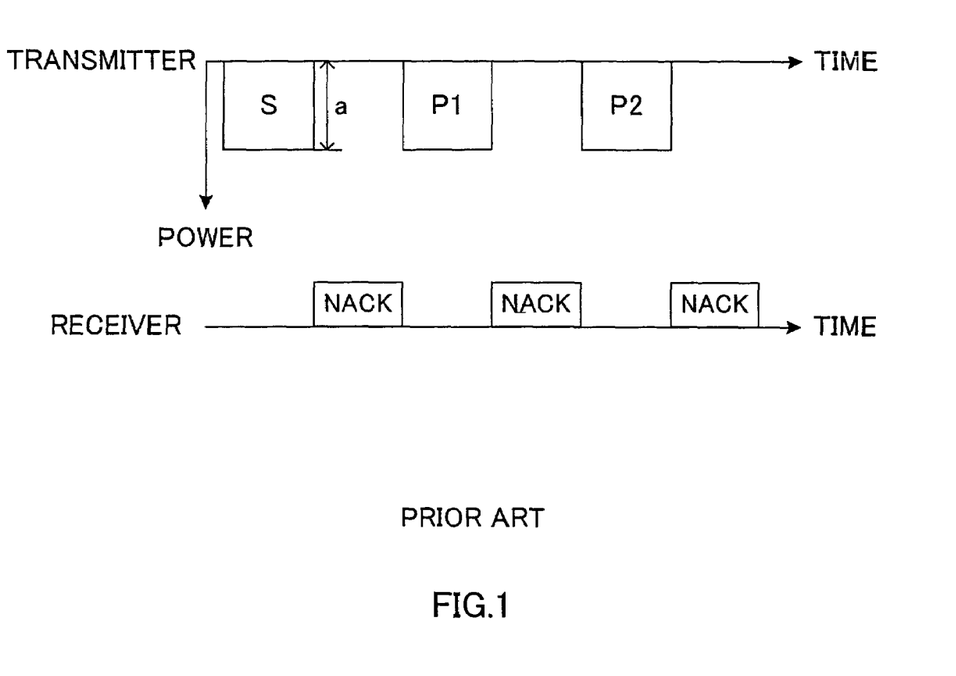
FIG. 1 is a diagram showing the procedures of a conventional type-2 hybrid ARQ method.

In this method, turbocoding is performed intransmission apparatus as shown in FIG. 1, among turbo encoded signals, an information bit (also called "systematic bit") (S) is first transmitted, then an error detection is carried out in the reception apparatus. When an error is detected, a NACK (Negative ACKnowlegement) signal is returned back to transmission apparatus from reception apparatus. In this case, transmission apparatus transmits parity bit 1 (P1) (redundancy bit) of FEC (Forward Error Correction) for use in an error correction, and reception apparatus carries out turbo decoding using information bit and parity bit 1. Moreover, when an error was detected, in response to the NACK signal from reception apparatus, transmission apparatus transmits parity bit 2 (P2) of FEC for use in an identical error correction, and reception apparatus carries out turbo decoding using information bit, parity bit 1, and parity bit 2. In addition, when there is no error, an ACK (ACKnowlegement) signal is returned back and the next data is requested.

However, the aforementioned method includes the following problem.

In turbo code, the quality of an information bit in the reception signal reflects a large influence in the quality of signal after decoding. In other words, in the case when the quality of information bit is bad (for instance, low SNR), it may be difficult to carry out good decoding even when the parity bit quality is high, hence, it may be also difficult to obtain a decoded signal with high quality. Therefore, in type-2 hybrid ARQ method, information bit is first transmitted, and in the case when the first transmitted information bit is received with low SNR because the quality is deteriorated due to fading etc. as parity bit is transmitted in the case of retransmission, the quality after combining of a large number of retransmitted parity bits may not be improved and a useless retransmission may be continued.

In view of the aforementioned problem, it is an object of the present invention to provide a data communication apparatus and data communication method based on type-2 hybrid ARQ method which can improve quality of transmission data while avoiding the increase of power consumption.

As a method of transmitting a high speed packet with good efficiency, HSDPA (High Speed Down-link Packet Access) is proposed in 3GPP (3rd Generation Partnership Project). In such a method, the transmission rate is updated by changing channel codec, spreading factor, multiplexing (multiplex value), or modulation according to channel environment, and the average throughput is improved using such a method.

When an adaptation modulation of HSDPA is carried out, it is necessary for transmission apparatus (radio base station) to transmit an MCS (Modulation and Coding Scheme) to reception apparatus (communication terminal). MCS is information related to transmission packet data such as the modulation method (QAM (Quadrature Amplitude Modulation), QPSK (Quadrature Phase Shift Keying), 8PSK (8 Phase Shift Keying)), etc., or the coding rate (R=½, ⅓), etc. Reception apparatus demodulates data of packet channel using such MCS information, and carries out a decoding processing.

However, there is a problem that the capacity of downlink channel decreases since the transmission side (radio base station) transmits the MCS information. In addition, there is another problem related to transmission of MCS information within a cell that is an increase of inter-cell interference is provided.

DISCLOSURE OF INVENTION

It is an object of the present invention to provide a data communication apparatus and data communication method based on type-2 hybrid ARQ method which can improve quality of a transmission data while avoiding increase of power consumption.

According to one embodiment of the present invention, the data communication apparatus based on a hybrid automatic retransmission request method comprises transmission section to transmit identical transmission data several number of times, and control section to control transmission power of transmission data so that a total transmission power of plural transmission times of identical transmission data transmitted several number of times becomes constant.

According to another embodiment of the present invention, the data communication method based on hybrid automatic retransmission request method includes plural times transmission of identical transmission, and controlling transmission power of transmission data so that the total transmission power of plural transmission times of the identical transmission data transmitted several number of times becomes constant.

One or more objects of the invention may be achieved by a data communication apparatus that employs hybrid automatic repeat request. The data communication apparatus includes a transmission section that transmits identical transmission data, which is a packet containing an information bit, several times. A control section controls transmission power of transmission data so that the total transmission power of several transmission times corresponding to identical transmission data transmitted several times becomes constant. A distribution section distributes larger transmission data to transmission data than a redundancy bit used for error correction while keeping the total transmission power of transmission data and the redundancy bit used for error correction which is transmitted as a retransmission after transmission of transmission data.

One or more objects of the invention may also be achieved by a data communication method that employs hybrid automatic repeat request. According to this method, identical transmission data, which is a packet containing an information bit, is communicated several times. The transmission lower of transmission data is controlled so that the total transmission power of several transmission times corresponding to identical transmission data transmitted several times becomes constant. Larger transmission power is distributed to transmission data than a redundancy bit used for error correction while keeping the total transmission power of transmission data and the redundancy bit used for error correction which is transmitted as a retransmission after transmission of transmission data.

BEST MODE FOR CARRYING OUT THE INVENTION

Hereafter, embodiments of the present invention will be specifically described with reference to the accompanying drawings.

(Embodiment 1)

Figure 2:
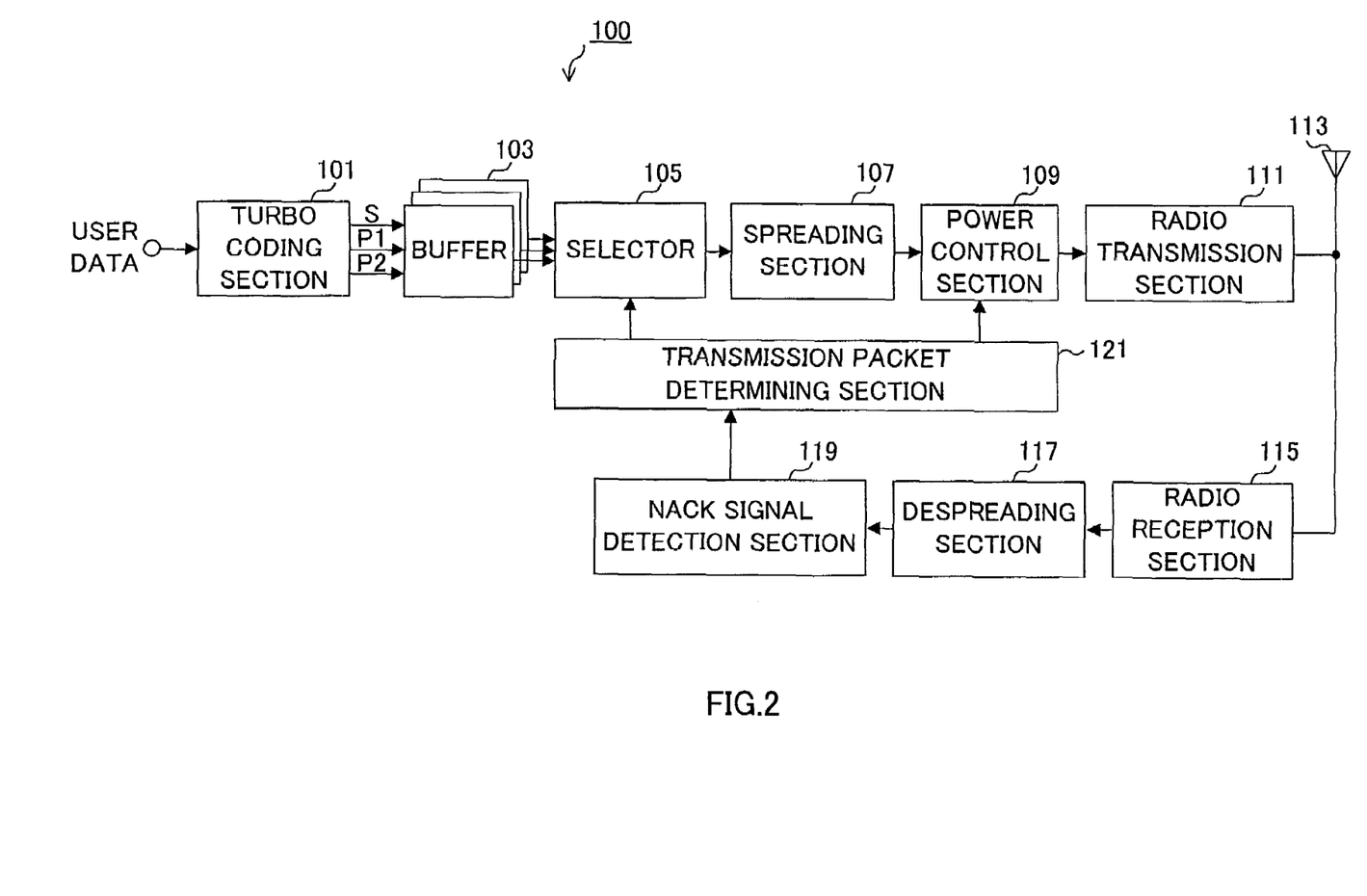
FIG. 2 is a block diagram showing a configuration of a transmission side of data communication apparatus according to Embodiment 1 of the present invention.

FIG. 2 is a block diagram showing a configuration of a transmission side (that is, transmitter) of a data communication apparatus according to Embodiment 1 of the present invention;

Transmitter 100 shown in FIG. 2 which is used in data communication system based on type-2 hybrid ARQ method using turbo code (IR method) is provided with turbo coding section 101, buffer 103, selector 105, spreading section 107, power control section 109, radio transmission section 111, transmit/receive multiplexing antenna 113, radio reception section 115, despreading section 117, NACK signal detection section 119, and transmission packet determining section 121. For instance, transmitter 100 can be built in base station apparatus of a mobile communication system.

Figure 3:
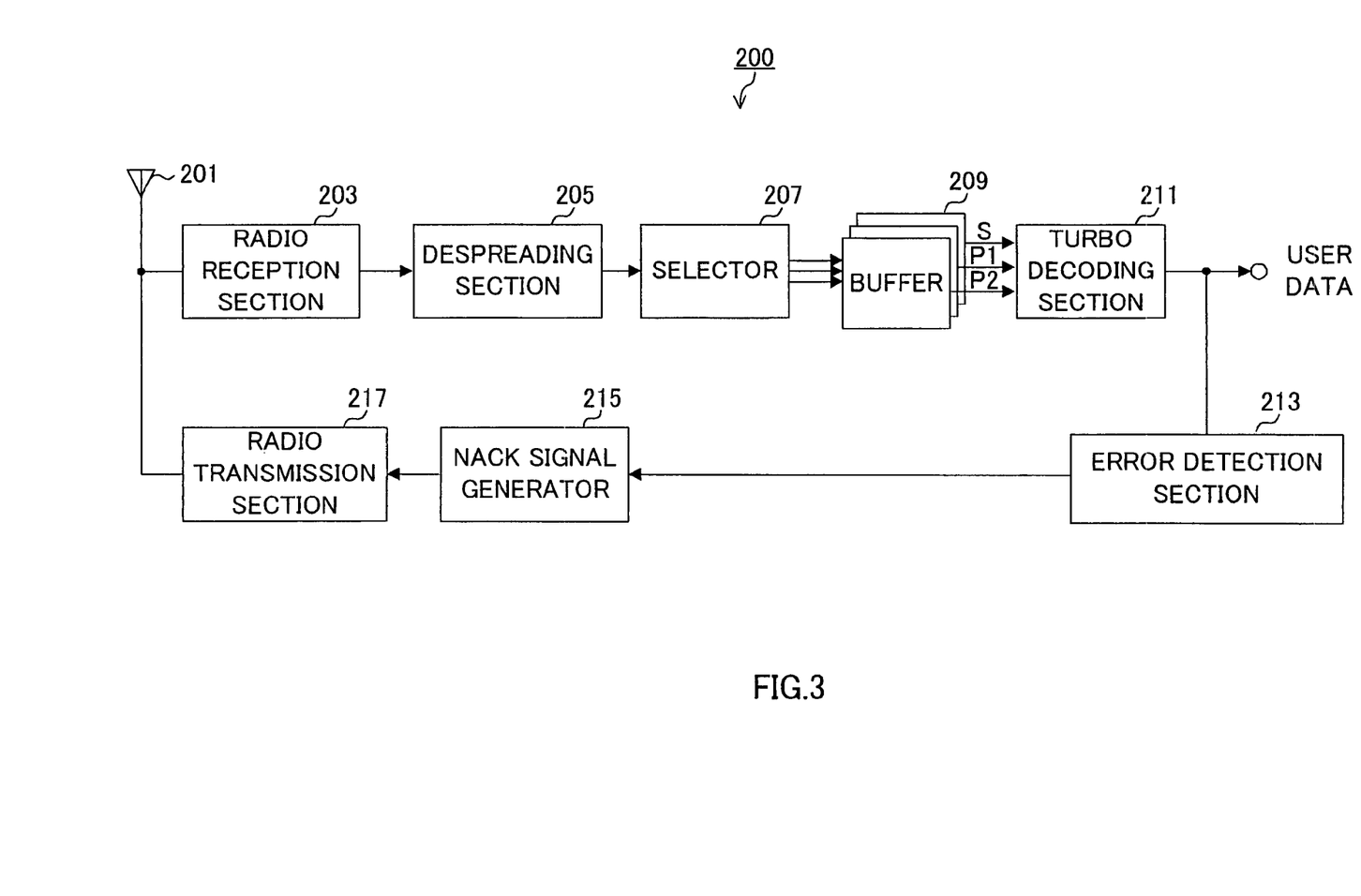
FIG. 3 is a block diagram showing a configuration of a reception side of data communication apparatus according to Embodiment 1 of the present invention.

FIG. 3 is a block diagram showing a configuration of a reception side (i.e. receiver) corresponding to transmitter 100 shown in FIG. 2.

Receiver 200 shown in FIG. 3 has transmit/receive multiplexing antenna 201, radio reception section 203, despreading section 205, selector 207, buffer 209, turbo decoding section 211, error detection section 213, NACK signal generator 215, and radio transmission section 217. For instance, receiver 200 can be built in mobile station apparatus of a mobile communication system.

Data communications system of an IR method according to the present embodiment is constructed using transmitter 100 and receiver 200.

Operations of data communication system constructed as described above will be explained below with reference to the general procedures shown in FIG. 4.

First, turbo coding of user data inputted to transmitter 100 is carried out by turbo coding section 101. Since assuming the coding rate R=⅓ as an example, such turbo coding section 101 outputs 3 output signals corresponding to 1 inputted signal (user data), namely, information bit (S), parity bit1 (P1) (redundant bit), and parity bit2 (P2) (redundant bit). In such a case, user data is just outputted as an information bit. The signals after turbo encoding (information bit, parity bit 1, parity bit 2) are outputted to buffer 103, respectively.

In buffer 103, the signals after turbo encoding (information bit, parity bit1, parity bit2) outputted from turbo coding section 101 are each accumulated in a corresponding buffer domain.

The signals after turbo encoding (information bit, parity bit1, parity bit2) which were accumulated in buffer 103 are outputted to spreading section 107 as transmission packet after being selected by selector 105. In addition, selector 105 is operated by transmission packet determining section 121.

The procedures to select (determine) transmission packet, that is, the packet transmission procedures are given below. First, as shown in FIG. 4, packets of identical information bit (S) which is time shifted is transmitted several times (2 times in the example of FIG. 4), in case of retransmission (when a NACK signal is detected), packet of parity bit1 (P1) is transmitted, in case of retransmission, further, (when NACK signal is detected), packet of parity bit2 (P2) is transmitted. Such a transmission procedure is determined based on the detection result of NACK signal detection section 119 in transmission packet determining section 121.

In spreading section 107, transmission packet selected by selector 105 is spread then outputted to power control section 109.

In power control section 109, transmission power of a transmission packet after being spread is controlled (updated) for every packet. Specifically, in the case when transmission packet, for example, is the information bit (S) as shown in FIG. 4, the value b of the transmission power is updated to ½ of value a (cf. FIG. 1) of transmission power of normal 1 packet (b=a/2). On the other hand, in the case when transmission packet is parity bit1 (P1) or parity bit2 (P2), the value of transmission power is the value a of transmission power of normal 1 packet. In other words, a packet of information bit is transmitted with ½ of normal transmission power while packets of parity bit1 and parity bit2 are transmitted with normal transmission power. Thus, the classification of a transmission packet is recognized based on information from transmission packet determining section 121.

Figure 4:
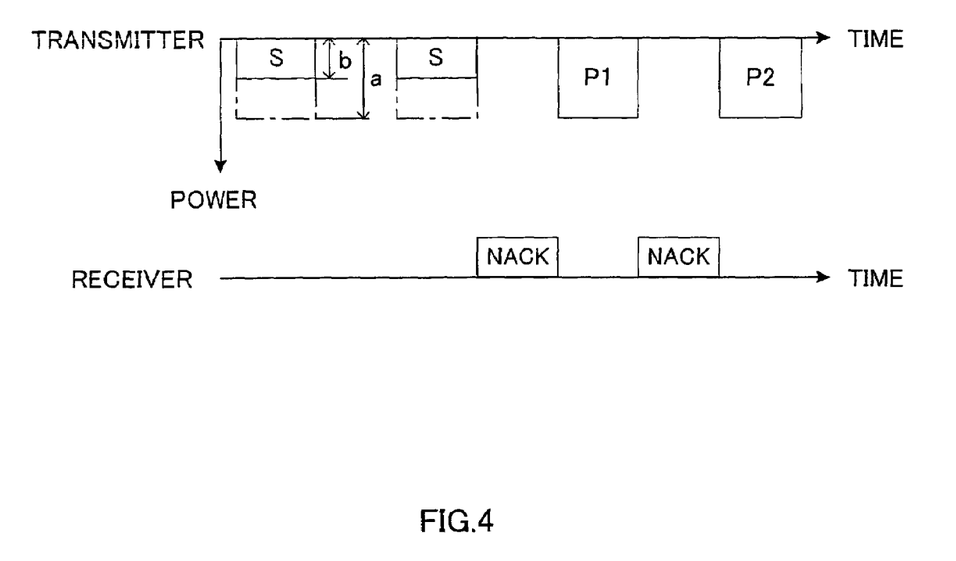
FIG. 4 is a diagram showing the procedures of type-2 hybrid ARQ method according to Embodiment 1.

In the example of FIG. 4, moreover, a packet of similar information bit is divided into twice, and then transmitted, but the transmission number of times is not limited to this. In such a case, if the number of transmission times of similar information bit is set to N times, the value b of transmission power of 1 packet of information bit in every transmission is set to 1/N of value a of transmission power of normal 1 packet (b=a/N).

The transmission power of a determined transmission packet after being spread is radio transmitted from antenna 113 after being subjected to a predetermined transmission processing such as up-conversion, etc. in radio transmission section 111.

After this, receiver 200 receives the signal radio transmitted form transmitter 100 by antenna 201. The signal received by antenna 201 is outputted to despreading section 205 after being subjected to a predetermined reception processing such as down-conversion, etc. in radio reception section 203.

The reception signal inputted from radio reception section 203 is outputted to selector 207 after being despread in despreading section 205.

In selector 207, the reception signal after being despread is accumulated in buffer 209 according to data classification.

In other words, based on the data classification information bit, parity bit 1, and parity bit 2, the reception signal after being despread is accumulated in a corresponding buffer domain.

The signal is subjected to turbo decoding at the reception time in turbo decoding section 211.

Specifically, based on the information bit which is received several times (N times), (more specifically, the information bit after diversity combining) turbo decoding is executed at the reception time of information bit, when parity bit 1 is received, the turbo decoding is executed based on previously N-times received information bit and presently received parity bit 1, when parity bit 2 is received, turbo decoding is executed based on previously received N times information bit, previously received parity bit 1, and presently received parity bit 2. The signal subjected to turbo decoding is extracted as a user data and outputted to error detection section 213.

An error detection is performed on the signal subjected to turbo decoding in error detection section 213. As an example of error detection, is the one using CRC (Cyclic Redundancy Check) coding. The result of error detection is outputted to NACK signal generation section 215.

A NACK signal is generated in NACK signal generation section 215, for instance, when an error was detected in the signal subjected to turbo decoding, additionally, an ACK signal is generated when an error was not detected in the signal subjected to turbo decoding. However, an ACK signal can be generated in dedicated ACK signal generation section.

The generated NACK or ACK signal is radio transmitted from antenna 201 after being subjected to a predetermined transmission processing such as, up-conversion, etc. in radio transmission section 217.

Then, transmitter 100 receives the NACK signal or ACK signal radio transmitted from receiver 200 by antenna 113. The NACK signal or ACK signal received by antenna 201 is outputted to despreading section 117 after being subjected to a predetermined reception processing such as down-conversion, etc. in radio reception section 115.

The reception signal inputted from radio reception section 115 is outputted to NACK signal detection section 119 after being despread in despreading section 117.

The reception signal after being despread is detected whether includes NACK signal or not in NACK signal detection section 119. The detection result (i.e. NACK signal or ACK signal) is outputted to transmission packet determining section 121.

The next transmission of packet is determined based on the detection result of NACK signal detection section 119 in transmission packet determining section 121. Specifically, the packet of an identical information bit (S) is time shifted at the time of starting operation or ACK signal detection in order to transmit several number of times (N times) when the NACK signal detected after the identical information bit which is transmitted N times, packet of parity bit 1 (P1) is transmitted and parity bit 1 is selected, in addition, when NACK signal is detected in an identical information bit which was transmitted N number of times and after parity bit 1 was transmitted sequentially afterwards, a packet of parity bit 2 (P2) is transmitted and parity bit 2 is selected. In other words, the sequence of the packet transmission is information bit (S)×N times→parity bit 1 (P1)→parity bit 2 (P2). A decision result of transmission packet determining section 121 is outputted, as described above, to selector 105 and power control section 109.

Specific example of the aforementioned operation is given next; a 2 times transmission of an identical information bit is explained as an example using FIG. 4. In such a case;, first, transmitter 100 transmits a packet of an information bit (S) with normal transmission power ½ (b=a/2) twice. In addition, the packet of parity bit 1 (P1) is transmitted with normal transmission power one time when a NACK signal was returned from receiver 200. The packet of parity bit 2 (P2) is transmitted when a NACK signal was further returned from receiver 200. Considering such a transmission procedures, the power employing in the transmission of information bit is similar to the conventional case and in order to transmit an identical information bit twice, the time diversity effect can be obtained by combining (diversity combining) of the two times signal received by receiver, and it is possible to improve the SNR of information bit and increase the performance further than the conventional method.

Thus, according to data communication system using the data communication apparatus of the present invention, identical information bit is transmitted several number of times (N times), and in this case, the total of transmission power of N times corresponding to N times transmitted identical information bit becomes fixed, for example, in order to change the transmission power of transmission packet of every packet (packet classification) so that the transmission power of a packet portion of information bit in each transmission time becomes 1/N of transmission power of the normal packet, the transmission power employed in transmission of information bit is similar to the conventional method case, in addition, by combining the N times transmitted information bit in the receiver side, It is possible to obtain the effect of time diversity, thus, it is possible to avoid increasing of power consumption while improving the quality of an information bit.

Moreover, considering the characteristics of the turbo code, while keeping the total power employed in transmission of packet information bit and packet parity bit constant as method of transmission power distribution, there is several methods of distribution of transmission power of packet of parity bit and packet of information bit, performing the aforementioned sequential transmission is also acceptable. In such a case, it is possible to improve the performance of turbo code and improve further the quality of the transmission data.

(Embodiment 2)

Figure 5:
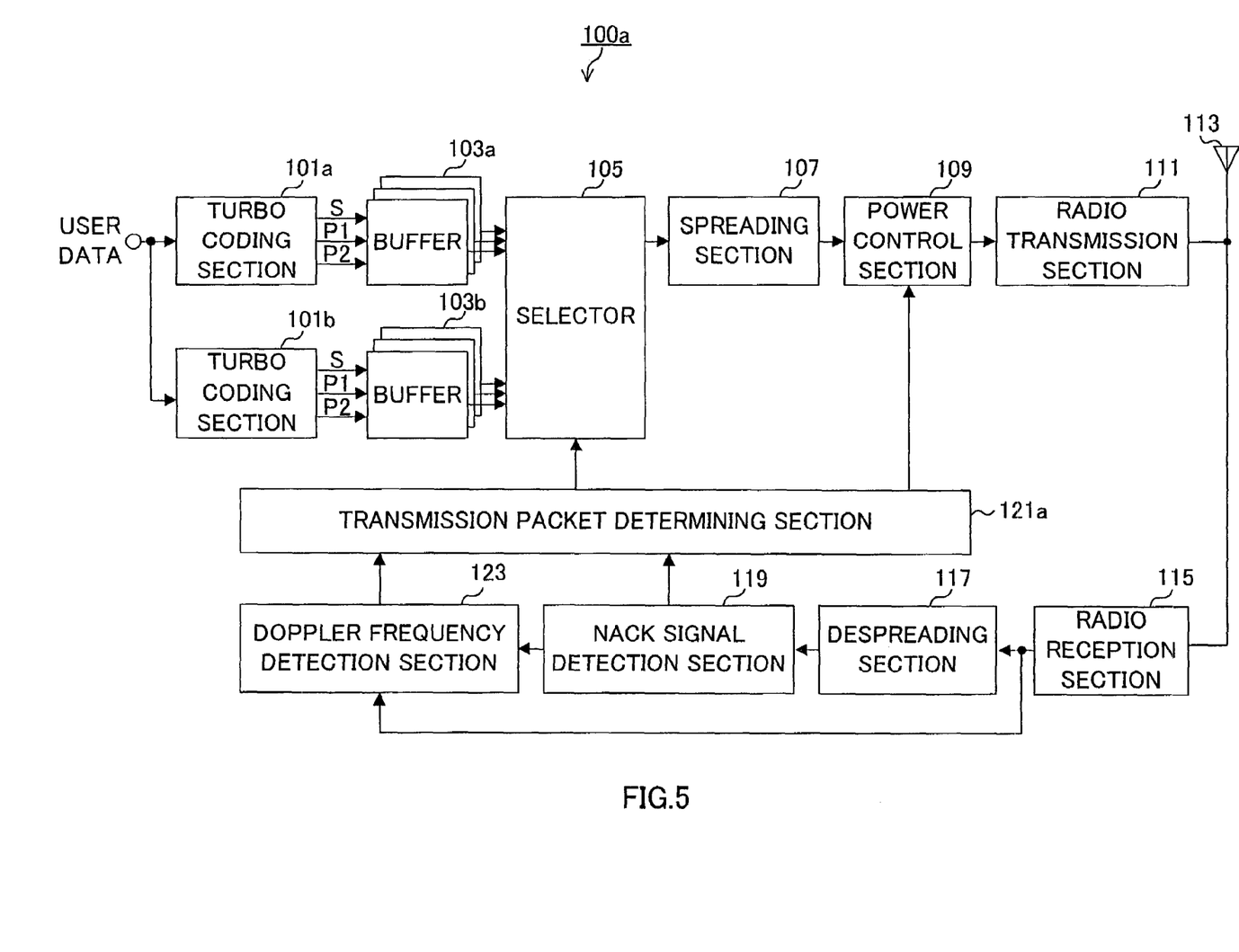
FIG. 5 is a block diagram showing a configuration of a transmission side of data communication apparatus according to Embodiment 2 of the present invention.

FIG. 5 is a block diagram showing a configuration of a transmission side (i.e. transmitter) of a data communication apparatus according to Embodiment 2 of the present invention. Such a transmitter 100*a* is employed by data communication system based on type-2 hybrid ARQ method (IR method) used in turbo code, and has a similar basic configuration of transmitter 100 of Embodiment 1 shown in FIG. 2, and similar configuration elements are assigned the same reference numerals and explanation thereof is omitted.

Transmitter 100*a* of the present embodiment updates the transmission number of times (N) of similar information bit depending on the doppler frequency, and multiplexes the data of plurality of similar users (M), then the multiplexed data is transmitted simultaneously. It will be explained sequentially as follows.

First, in the present embodiment, transmitter 100*a* has doppler frequency detection section 123. Doppler frequency detection section 123 detects the doppler frequency of the reception signal which is inputted from radio reception section 115. The doppler frequency is the amount of shift (movement) of the frequency based on the doppler effect generated due to the occurrence of the relative movement between transmitter and receiver. In such a case, a low frequency shift occurs when receiver 200 moving a way from transmitter 100a, and a high frequency shift occurs when receiver 200 moving closer to transmitter 100a. The detection result of doppler frequency detection section 123 is outputted to transmission packet determining section 121a.

The transmission number of times (N) of the similar information bit is interchanged in transmission packet determining section 121a based on detection result (doppler frequency) of doppler frequency detection section 123. Specifically, transmission number of times is decreased (the value of N is decreased) because increasing of time diversity effect of a possible low transmission speed is not necessary as frequency diversity effect is obtained easily when the doppler frequency is high. Since the time until transmission of information bit N times becomes short by decreasing the number of transmission times, there is possibility to shorten the time until finishing transmission of data. On the contrary, transmission number of times is increased (the value of N is increased) because increasing of time diversity effect is necessary as frequency diversity effect is obtained hardly when the doppler frequency is low. Thus, it is possible effectively to acquire the diversity effect depending on relative movement situation between transmitter 100a and receiver, and while planning quality improvement of transmission data, it is also possible to avoid the reduction of transmission speed by increasing the transmission number of times.

In addition, in the present embodiment, transmitter 100a transmits simultaneously the data of a plurality of similar users (here two) after being multiplexed. Therefore, transmitter 100a has two turbo coding sections 101a and 101b and two buffers 103a and 103b. Turbo coding sections 101a, 101b are of common coding rate R=⅓. The signal outputted from turbo coding section 101a after being turbo encoded (information bit, parity bit 1, and parity bit 2) is accumulated in buffer 103a, and the signal outputted from turbo coding section 101b after being turbo encoded (information bit, parity bit 1, and parity bit 2) is accumulated in buffer 103b. The information bit of the data of the two similar users accumulated in buffer 103a and buffer 103b is outputted to spreading section 107 after being selected by selector 105a and multiplexed. In addition, the consecutive data of the two identical users inputted from not shown signal distribution section distributed respectively between turbo coding section 101a and turbo coding section 101b.

Figure 6:
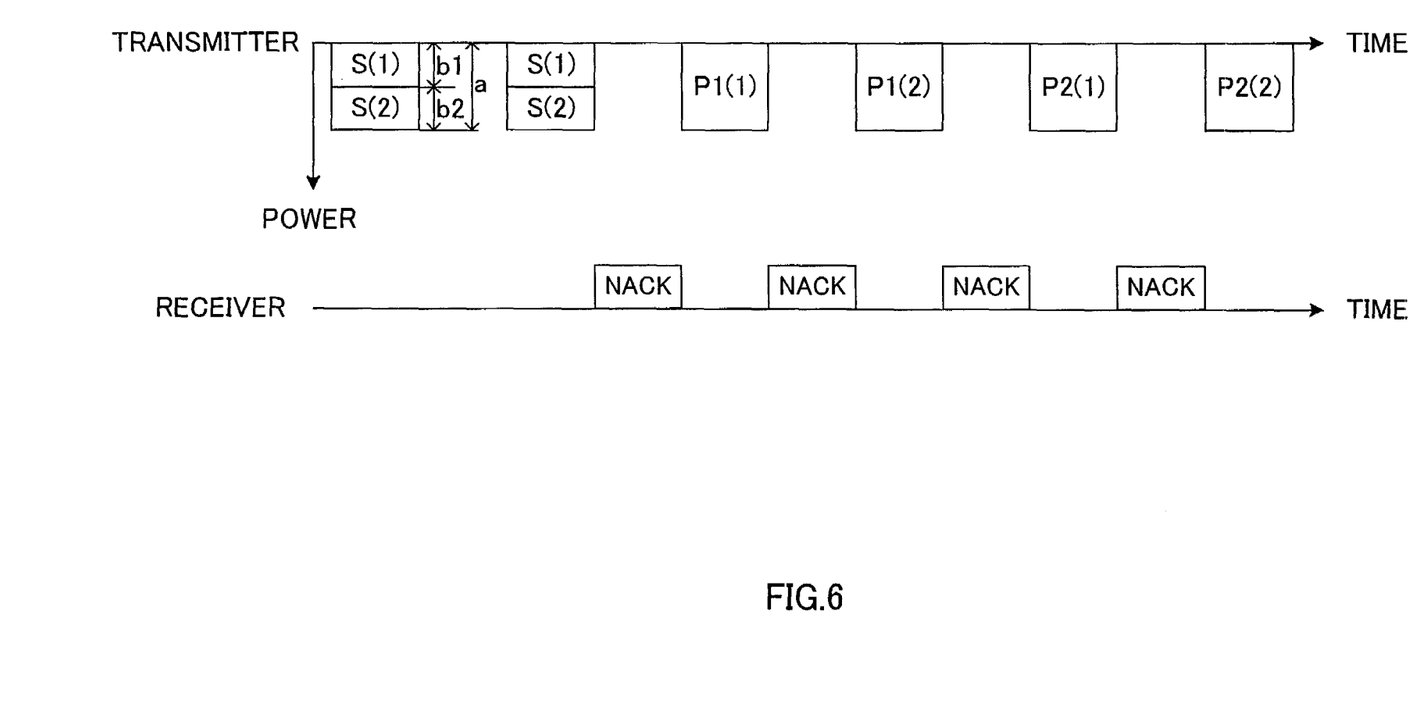
FIG. 6 is a diagram showing the procedures of type-2 hybrid ARQ method according to Embodiment 2.

Next, an exemplary operation of transmitter 100a will be specifically explained using FIG. 6. Here, the case when the information bit of data of two identical users is multiplexed and simultaneously transmitted two times will be explained as an example.

In such a case, when data 1 of identical users is transmitted, the next data 2 is transmitted simultaneously, that is to say, the consecutive data 1 and data 2 of the identical users are multiplexed and then transmitted simultaneously. Prior to multiplexing, the data 1 is subjected to turbo coding in turbo coding section 101a, the information bit (S(1)), parity bit 1 (P1(1)), and parity bit 2 (P2(1)) after being turbo encoded are accumulated in the corresponding buffer 103a. Moreover, the data 2 is subjected to turbo coding in turbo coding section 101b, the information bit (S(2)), parity bit 1 (P1(2)), and parity bit 2 (P2(2)) after being turbo encoded are accumulated in the corresponding buffer 103b.

Transmitter 100a, first, multiplexes information bit S(1) and S(2) of the data of two identical users and transmits the result two times simultaneously. At that time, the value b1 of the transmission power of one packet of information bit S(1) of data of the identical user in each transmission time is ½ of the normal value a of transmission power of one packet (b1=a/2), in addition, similarly, the value b2 of the transmission power of one packet of information bit S (2) of data 2 of the identical user in each transmission time is ½ of the normal value a of transmission power of one packet (b2=a/2). In other words, the power employed in the transmission of an identical information bit is similar to the case of a conventional method (b1×2=a), and the total of transmission power of the information bit multiplexed in each transmission time is similar to the case of the conventional method (b1+b2=a). Thus, since the power employed in transmission of information bit of the data of two identical users is similar to that of the conventional method as a whole, even in the case when the information bit of the data of the two identical users are multiplexed and then transmitted simultaneously, it is possible to avoid the increasing of power consumption, further, since it is also possible to obtain the time diversity effect of each of information bit of the data of the two identical users, the SNR of the information bit can be improved and the performance can be also enhanced further than the conventional method.

Moreover, in the case when the identical information bit is transmitted N times, the multiplexed information bits of the number of data (M) of identical users is preferably less than or equal to N (M≦N). As described above, in the case when identical information bits are transmitted N times, 1/N of a of the normal transmission power of a packet is set as (b=a/N) since the value b of the transmission power of one packet of each individual information bit in each transmission time, and the total of the transmission power of the multiplexed information bits in each individual transmission power is made less than the value a of transmission power of one packet of the conventional method as it is necessary to set the multiplexed data number of identical users less than N.

Moreover, the parity bit of packet number (1) (P1(1), P2(1)), and the parity bit of packet number (2) (P1(2), P2(2)) are transmitted alternately as shown in FIG. 6 when a NACK signal was returned from receiver 200. Thus, the timing of decoding of the data of two identical users which is multiplexed and transmitted simultaneously can be averaged, and it is possible to shorten the delay of the decoding process.

Therefore, according to data communication system using the data communication apparatus of the present invention, the data transmission efficiency (throughput) can be improved as the information bits of data of a plurality of identical users are multiplexed and transmitted simultaneously at individual information bit transmission time.

Moreover, as the number of transmission times of identical information bit is updated according to doppler frequency, it is possible to efficiently acquire the diversity effect depending on relative movement situation between transmitter 100a and receiver 200, and while planning quality improvement of transmission data, it is also possible to avoid the reduction of transmission speed by increasing the transmission number of times.

Moreover, while keeping the total power employed in transmission of packet information bit and packet parity bit constant as a method of transmission power distribution, there is several methods of distribution of transmission power of packet of parity bit and packet of information bit, performing the aforementioned sequential transmission is also acceptable, similar to the case of Embodiment 1.

(Embodiment 3)

Figure 7:
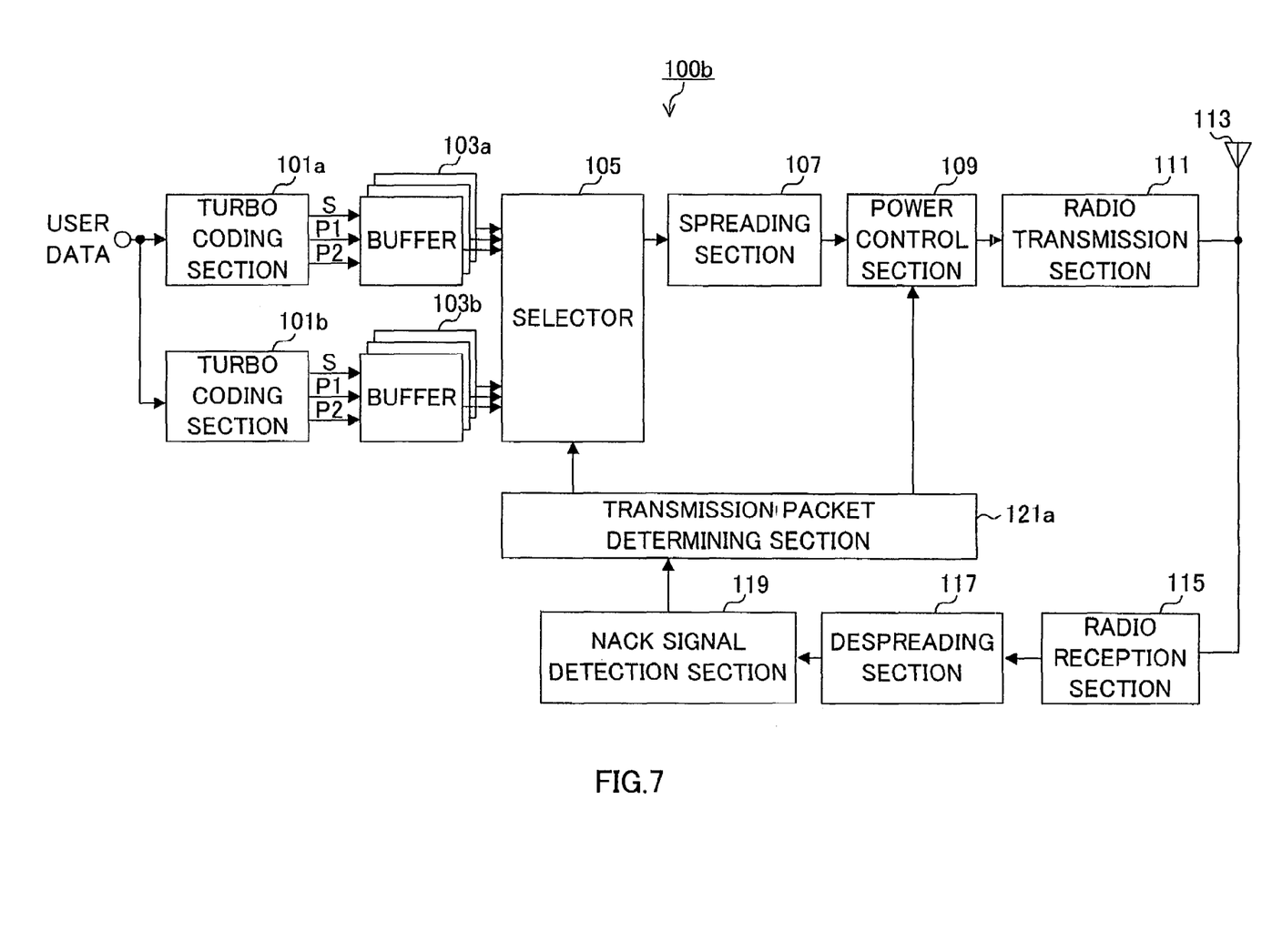
FIG. 7 is a block diagram showing a configuration of a transmission side of data communication apparatus according to Embodiment 3 of the present invention.

FIG. 7 is a block diagram showing a configuration of a transmission side (i.e. transmitter) of a data communication apparatus according to Embodiment 3 of the present invention. Such a transmitter 100b is employed by data communication system based on type-2 hybrid ARQ method (IR method) used in turbo code, and has a similar basic configuration of transmitter 100 of Embodiment 1 shown in FIG. 2, and the same configuration elements are assigned the same reference numerals and explanation thereof will be omitted.

The transmitter 100b of the present embodiment transmits simultaneously the data of a plurality of users (M) after being multiplexed. The difference to Embodiment 2 relating the multiplexing is that the data of an identical plural number of users are multiplexed in Embodiment 2, while the data of a plurality of users are multiplexed in the present embodiment. Therefore, similar to Embodiment 2, although there are two turbo coding sections 101a and 101b and two buffers 103a and 103b in the present embodiment, different user data are mutually inputted to the two turbo coding sections 101a and 101b respectively.

Figure 8:
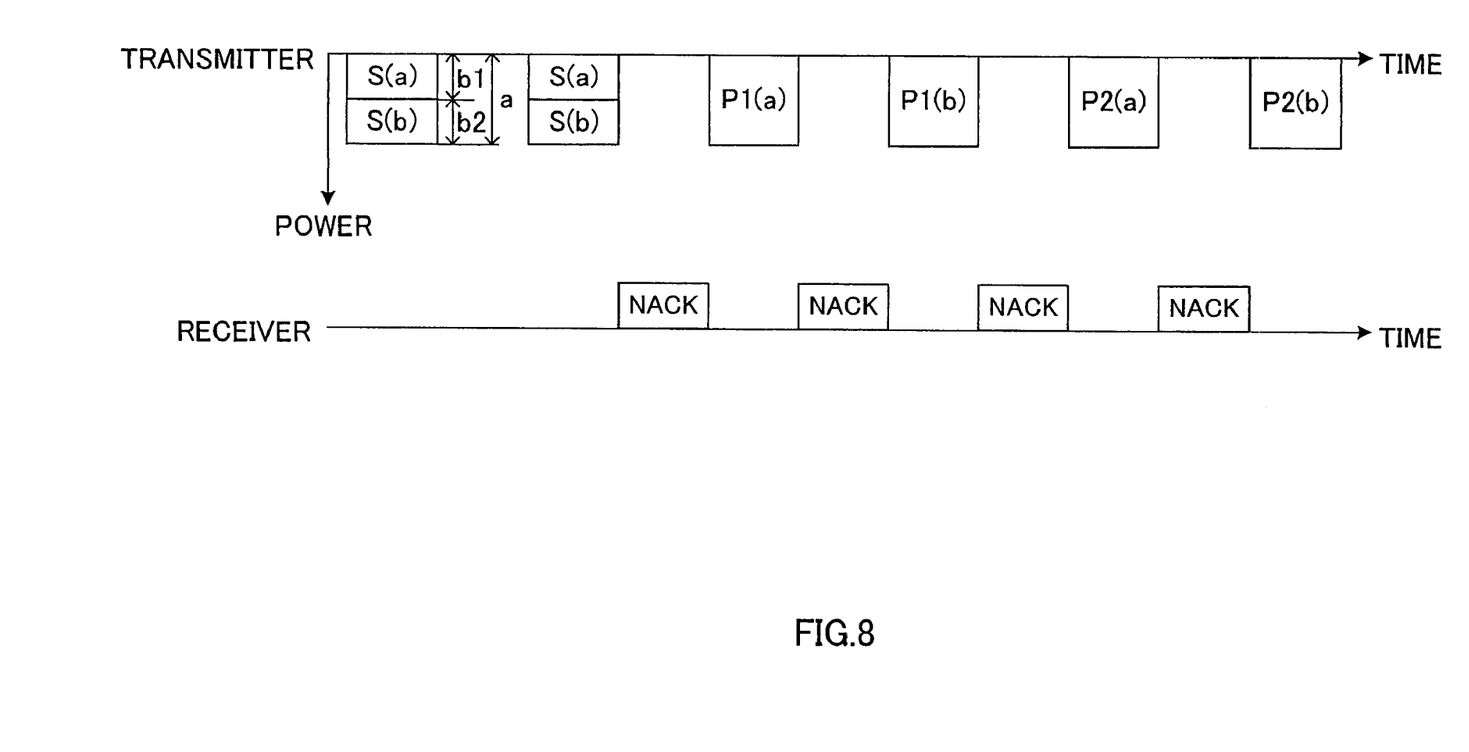
FIG. 8 is a diagram showing the procedures of type-2 hybrid ARQ method according to Embodiment 1.

Next, the operation of transmitter 100b will be specifically explained using FIG. 8. Here, the case when the information bits of data of two users, user A and user B are multiplexed and simultaneously transmitted twice will be explained as an example.

In such a case, when the data of user A is transmitted, the data of the other user B is transmitted simultaneously, that is to say, the data of the two users, user A and user B are multiplexed and then transmitted simultaneously. Prior to multiplexing, the data of user A is subjected to turbo coding in turbo coding section 101a, the information bit (S(a)), parity bit 1 (P1(a)), and parity bit 2 (P2(a)) after being turbo encoded are accumulated in the corresponding buffer 103a. Moreover, the data of user B is subjected to turbo coding in turbo coding section 101b, the information bit (S(b)), parity bit1 (P1(b)), and parity bit 2 (P2(b)) after being turbo encoded are accumulated in the corresponding buffer 103b.

Transmitter 100b, first, multiplexes information bit S(a) of data of user A and information bit S(b) of data of user B and transmits the result twice simultaneously. In such a case, the value b1 of transmission power of one packet of information bit S(a) of data of user A in each transmission time is ½ of the normal value a of transmission power of one packet (b1=a/2), in addition, similarly, the value b2 of the transmission power of one packet of information bit S(b) of data of user B in each transmission time is ½ of the normal value a of transmission power of one packet (b2=a/2). In other words, the power employed in the transmission of an identical information bit is similar to the case of a conventional method (b1×2=a), and the total of transmission power of the information bit multiplexed in each transmission time is similar to the case of the conventional method (b1+b2=a). Thus, since the power employed in transmission of information bit of the data of the two users, user A and user B is similar to that of the conventional method as a whole, even in the case when the information bit of the data of the two users, user A and user B are multiplexed and then transmitted simultaneously, it is possible to avoid the increasing of power consumption, further, since it is also possible to obtain the time diversity effect of each of information bit of the data of the two users, user A and user B the SNR of the information bit can be improved and the performance can be also enhanced further than the conventional method.

Moreover, in the case when the identical information bit is transmitted N times, the multiplexed information bits of the data number (M) of users is preferably less than or equal to N (M≦N). As described above, in the case when identical information bits are transmitted N times, 1/N of a of the normal transmission power of one packet is set as (b=a/N) since the value b of the transmission power of one packet of each individual information bit in each transmission time, and the total of the transmission power of the multiplexed information bits in each individual transmission is made less than the value a of transmission power of one packet of the conventional method as it is necessary to set the multiplexed data of different users less than N.

Moreover, the parity bit of packet number (1) (P1(1), P2(1)), and the parity bit of packet number (2) (P1(2), P2(2)) are transmitted alternately as shown in FIG. 6 when a NACK signal was returned from receiver 200. Thus, the timing of decoding of the data of two users, user A and user B which is multiplexed and transmitted simultaneously can be averaged, and it is possible to shorten the delay of the decoding process.

Therefore, according to data communication system using the data communication apparatus of the present invention, the data transmission efficiency (throughput) can be improved as the information bits of data of a plurality of users are multiplexed and transmitted simultaneously at individual information bit transmission time.

Moreover, while keeping the total power employed in transmission of packet information bit and packet parity bit constant as a method of transmission power distribution, there is several methods of distribution of transmission power of packet of parity bit and packet of information bit, performing the aforementioned sequential transmission is also acceptable similar to the case of Embodiment 1.

Furthermore, in the aforementioned embodiment, although an error detection is executed after the information bit is transmitted several times (N times) and the parity bit is transmitted at the NACK signal reception time, it is possible to adopt a method, instead of this method, in which the error detection is executed every time the information bit is transmitted and the next information bit is transmitted at NACK signal reception time. In such a method, if the SNR is high, there is possibility of successfully receiving the information bit without an error using only packets having 1/N of normal packet power even when a plurality (N) of packets (information bit) are not received. In this case, it is possible to minimize the time delay until finishing transmission of data.

The data communication system having the aforementioned transmitters 100, 100a, and 100b and receiver 200 can be applied to downlink high speed packet transmission in the mobile communication system.

As shown above and according to the present invention, as an identical transmission data is transmitted several number of times (for instance, N times), it is possible to acquire the time diversity effect by combining a plurality (N times) of the reception signal in the receiver, the quality of transmission data also can be improved. Moreover, in order to control the transmission power of the transmission data so that the total transmission power of a plurality of times (N times) corresponding to identical transmission data transmitted several times (N times) is constant, for example, the transmission power associated with the identical transmission data is set to a similar value of transmission power of conventional method, and the increasing of power consumption can be avoided.

Moreover, according to the present invention, the transmission power of one time is equivalent to that of identical transmission data transmitted several times (for instance, N times), and the total transmission power of a plurality of times (N times) corresponding to identical transmission data transmitted several times (N times) is made equivalent to transmission power of each transmission data in a method which transmits identical transmission data for 1 time (i.e. conventional method), that is to say, the transmission power of one time corresponding to identical transmission data becomes 1/N of the value of transmission power of transmission data of conventional method, in order to control the transmission power of transmission data, the necessary power for transmission of transmission data is similar to the case of conventional method, and by combining the data transmitted several times (N times) in the receiver, it is possible to acquire the time diversity effect. In other words, it is possible to avoid increasing of power consumption and improving the quality of transmission data.

According to the present invention, furthermore, the quality of information bit transmitted first, for example, in the type-2 hybrid ARQ method can be improved while avoiding the increase of power consumption.

Still further, according to the present invention, the number of times of transmission of identical transmission data is interchanged according to doppler frequency, for example, when the doppler frequency is high, the number of transmission times becomes small since it is easy to obtain the frequency diversity effect, while when the doppler frequency is low, the number of transmission times becomes large since it is difficult to obtain the frequency diversity effect, thus, it is possible to acquire diversity effect efficiently according to the relative movement situation between data communication apparatus, it is also possible to prevent the reduction of the high speed transmission by increasing the number of transmission times while improving the quality of transmission data.

According to the present invention, further, the data transmission efficiency (throughput) can be improved as a plurality of transmission data of identical users are multiplexed and transmitted simultaneously at individual transmission time.

Still further, according to the present invention, beside making the transmission power of identical transmission data, for instance, similar to the transmission power of the conventional method of each of a plurality of transmission data of identical user multiplexed and transmitted simultaneously, it is possible to make the value of the total transmission power at each transmission time of transmission data of a plurality of identical user multiplexed and transmitted simultaneously, for example, similar to the value of transmission power of conventional method, thus, it is possible to make the transmission power of transmission data at only each individual transmission time of identical transmission data similar to the case of conventional method, and the increase of power consumption can be avoided.

Still further, according to the present invention, in order to transmit sequentially (alternately) redundant bits corresponding to transmission data of a plurality of users in the case when the redundancy bits are transmitted, the timing of decoding of the transmission data of a plurality of identical users which is multiplexed and transmitted simultaneously can be averaged, and it is possible to shorten the delay of the decoding process.

According to the present invention, further, the data transmission efficiency (throughput) can be improved as transmission data of a plurality of users are multiplexed and transmitted simultaneously at individual transmission time.

Still further, according to the present invention, beside making the transmission power of identical transmission data, for instance, similar to the transmission power of the conventional method of each of transmission data of a plurality of identical user multiplexed and transmitted simultaneously, it is possible to make the value of the total transmission power at each transmission time of transmission data of a plurality of users multiplexed and transmitted simultaneously, for example, similar to the value of transmission power of conventional method, it is possible to make the transmission power of transmission data at only each individual transmission time of identical transmission data similar to the case of conventional method, and the increase of power consumption can be avoided.

Still further, according to the present invention, in order to transmit sequentially (alternately) redundant bits corresponding to transmission data of a plurality of users in the case when the redundancy bits are transmitted again, the timing of decoding of the transmission data of a plurality of users which is multiplexed and transmitted simultaneously can be averaged, and it is possible to shorten the delay of the decoding process.

Still further, according to the present invention, to distribute larger transmission power associated with transmission data than redundancy bit while keeping the total transmission power of transmission data and redundancy bits constant, for instance, when using turbo code, such a performance can be improved and the quality of transmission data can also be improved.

The present application is based on the Japanese Patent Application No. 2001-198401 filed on Jun. 29, 2001, entire content of which is expressly incorporated by reference herein.

INDUSTRIAL APPLICABILITY

The present invention can be applied in mobile communication system, specifically, mobile communication system based on hybrid automatic repeat request.

The invention claimed is:

1. A data communication apparatus employing hybrid automatic repeat request, said data communication apparatus comprising:
    a transmission section to transmit transmission data; and
    a control section to control transmission power of transmission data such that the total transmission power of several transmission times corresponding to identical transmission data transmitted several times becomes constant, wherein:
    said transmission data is packet of information bit, and
    said data communication apparatus further comprises:
        a distribution section that distributes larger transmission power to transmission data than to a redundancy bit used for error correction while keeping the same total transmission power of transmission data and redundancy bit used for error correction which are transmitted as a retransmission after transmission of transmission data.

2. The data communication apparatus according to claim 1, wherein said control section to control the transmission power of transmission data so that the transmission power of one time transmission is made mutually equivalent to identical transmission data which is transmitted several times, and total transmission power of a plurality of times corresponding to identical transmission data transmitted several times is made equivalent to transmission power of each transmission data in a method which transmits the identical transmission data one time.

3. The data communication apparatus according to claim 1, wherein said transmission section multiplexes and transmits a plurality of transmission data of identical user at each transmission time when identical transmission data is transmitted several times.

4. The data communication apparatus according to claim 3, wherein said control section to control the transmission power of transmission data so that the total transmission power of several transmission times corresponding to identical transmission data transmitted several times is constant for each of a plurality of transmission data of identical user multiplexed and transmitted simultaneously, and so that the total transmission power of each transmission time in a plurality of transmission data of identical user multiplexed and transmitted simultaneously is constant.

5. The data communication apparatus according to claim 3, wherein said transmission section transmits redundancy bits sequentially corresponding to plurality of transmission data of identical user in the case when the redundancy bits used for error correction is transmitted as a retransmission after the plurality of transmission data of identical user is multiplexed and simultaneously transmitted several times.

6. The data communication apparatus according to claim 1, wherein said transmission section multiplexes and transmits simultaneously the transmission data of a plurality of users at each transmission time when identical transmission data is transmitted several times.

7. The data communication apparatus according to claim 6, wherein said control section to control the transmission power of transmission data so that the total transmission power of several transmission times corresponding to identical transmission data transmitted several times is constant for each of a plurality of transmission data of a plurality of users multiplexed and transmitted simultaneously, and so that the total transmission power of each transmission time of transmission data of a plurality of users multiplexed and transmitted simultaneously is constant.

8. The data communication apparatus according to claim 6, wherein said transmission section transmits redundancy bits sequentially corresponding to transmission data of a plurality of users in the case when the redundancy bits used for error correction is transmitted as a retransmission after the transmission data of a plurality of users are multiplexed and simultaneously transmitted several times.

9. A data communication method based on hybrid automatic repeat request, wherein said data communication method comprising:
   transmitting identical transmission data several times; and
   controlling transmission power of transmission data so that the total transmission power of several transmission times corresponding to identical transmission data transmitted several times becomes constant, wherein said transmission data is packet of information bit, and said data communication method further comprising:
   distributing larger transmission power to transmission data than redundancy bit used for error correction while keeping the total transmission power of transmission data and redundancy bit used for error correction which is transmitted as a retransmission after transmission of transmission data.

* * * * *